(12) United States Patent
Allen et al.

(10) Patent No.: US 7,711,122 B2
(45) Date of Patent: May 4, 2010

(54) METHOD AND APPARATUS FOR CRYPTOGRAPHIC KEY STORAGE WHEREIN KEY SERVERS ARE AUTHENTICATED BY POSSESSION AND SECURE DISTRIBUTION OF STORED KEYS

(75) Inventors: Robert Allen, Palo Alto, CA (US); Robert A. Jerdonek, Sunnyvale, CA (US); John Wang, Sunnyvale, CA (US); Tom Wu, Mountain View, CA (US)

(73) Assignee: Arcot Systems, Inc., Santa Clara, CA (US)

( * ) Notice: Subject to any disclaimer, the term of this patent is extended or adjusted under 35 U.S.C. 154(b) by 1756 days.

(21) Appl. No.: 10/093,881

(22) Filed: Mar. 8, 2002

(65) Prior Publication Data
US 2002/0126850 A1    Sep. 12, 2002

Related U.S. Application Data

(60) Provisional application No. 60/274,457, filed on Mar. 9, 2001.

(51) Int. Cl.
*H04L 9/08* (2006.01)
*H04L 9/32* (2006.01)

(52) U.S. Cl. .................. 380/286; 380/277; 380/278; 380/282; 713/171

(58) Field of Classification Search .......... 380/277, 380/286; 713/171, 176, 167; 705/71; 726/27
See application file for complete search history.

(56) References Cited

U.S. PATENT DOCUMENTS

| | | | | |
|---|---|---|---|---|
| 5,016,274 A | * | 5/1991 | Micali et al. | 705/66 |
| 5,606,617 A | | 2/1997 | Brands | |
| 5,768,373 A | * | 6/1998 | Lohstroh et al. | 380/286 |
| 5,799,086 A | * | 8/1998 | Sudia | 705/76 |
| 5,889,860 A | * | 3/1999 | Eller et al. | 705/51 |
| 5,937,066 A | * | 8/1999 | Gennaro et al. | 380/286 |
| 5,960,086 A | * | 9/1999 | Atalla | 380/44 |
| 5,999,711 A | * | 12/1999 | Misra et al. | 726/4 |

(Continued)

OTHER PUBLICATIONS

Unknown author, "Electronic commerce: Key certifcate service: Key recovery", printed Jul. 28, 2008 from http://www.research.ibm.com/trl/projects/keycert/keyrec/index_e.htm, last modified: Jun. 30, 1998, 3 pages.*

*Primary Examiner*—Ponnoreay Pich
(74) *Attorney, Agent, or Firm*—Townsend and Townsend and Crew LLP

(57) ABSTRACT

A key management system includes secured data stored on a first system secured by a control key stored securely on a key server. The secured data is secured against attacks such as unauthorized use, modification or access, where authorization to access the secured data is determined by knowledge of an access private key of an access key pair. When an authorized user is to access the secured data, the first system generates a request to the key server, signed with the access private key, wherein the request is for a decryption control key and the request includes a one-time public key of a key pair generated by the first system for the request. The first system can decrypt the decryption control key from the response, using a one-time private key. The first system can then decrypt the secured data with the decryption control key remaining secured in transport.

8 Claims, 7 Drawing Sheets

U.S. PATENT DOCUMENTS

| | | | |
|---|---|---|---|
| 6,098,056 A * | 8/2000 | Rusnak et al. | 705/75 |
| 6,160,891 A * | 12/2000 | Al-Salqan | 380/286 |
| 6,170,058 B1 * | 1/2001 | Kausik | 713/193 |
| 6,185,685 B1 | 2/2001 | Morgan et al. | |
| 6,246,771 B1 * | 6/2001 | Stanton et al. | 380/286 |
| 6,335,972 B1 * | 1/2002 | Chandersekaran et al. | 380/286 |
| 6,754,349 B1 * | 6/2004 | Arthan | 380/286 |
| 6,775,382 B1 * | 8/2004 | Al-Salqan | 380/286 |
| 6,834,112 B1 * | 12/2004 | Brickell | 380/279 |
| 6,947,556 B1 * | 9/2005 | Matyas et al. | 380/29 |
| 7,178,169 B1 * | 2/2007 | Salmonsen et al. | 726/31 |
| 2001/0055395 A1 * | 12/2001 | Vogler | 380/273 |
| 2002/0016913 A1 | 2/2002 | Wheeler et al. | |
| 2002/0023215 A1 * | 2/2002 | Wang et al. | 713/171 |
| 2002/0026582 A1 | 2/2002 | Futamura et al. | |
| 2003/0110376 A1 * | 6/2003 | Wiener et al. | 713/158 |

* cited by examiner

METHOD AND APPARATUS FOR CRYPTOGRAPHIC KEY STORAGE WHEREIN KEY SERVERS ARE AUTHENTICATED BY POSSESSION AND SECURE DISTRIBUTION OF STORED KEYS

CROSS-REFERENCES TO RELATED APPLICATIONS

The present application claims priority from and is a non-provisional application of U.S. Provisional Application No. 60/274,457, entitled "METHOD AND APPARATUS FOR CRYPTOGRAPHIC KEY STORAGE USING A VERIFIER AND ACCOMMODATING KEY USERS THAT OPERATE INDEPENDENTLY OF THE VERIFIER" filed Mar. 9, 2001, the entire contents of which are herein incorporated by reference for all purposes.

FIELD OF THE INVENTION

The present invention relates generally to cryptographic systems and more particularly to key storage apart from data secured by the keys.

BACKGROUND OF THE INVENTION

Cryptography is used to secure data. In many systems, knowledge of a key allows access to the data and lack of knowledge of the key secures the data against access. Preferably, the key used to secure data is selected from a sufficiently large set of possible keys that an attacker cannot guess the key by exhaustive trial and error, even with the use of large amounts of computing resources. Usually, a key selected from a large set will be too long for people to remember, so it is necessary to employ a system that stores the key on behalf of the user and requires a passphrase to be entered before the key can be used. The passphrase, which can be a memorized password or PIN (Personal Identification Number), is typically converted directly into a cryptographic key and used to encrypt and decrypt the user's stored keys. Unfortunately, if the PIN or password is short enough for the user to remember, it is also short enough for an attacker to guess by exhaustive trial and error, thereby undermining the security of the stored key, and in turn undermining the security of the encrypted data.

One solution to the problem described above is to use central key management, wherein the keys are stored on a centralized server that is itself secured from access by attackers. When an attacker with access to a system having secured data thereon uses the brute force attack and tries each possible short passphrase, the centralized server receives a query from the system each time a passphrase is tried. Once the centralized server notices an unusual number of attempts, it can choose to ignore all further queries from that system and/or send alerts to a fraud manager or trigger alarms, if that is part of the design of the centralized server.

The use of centralized key servers to secure data is known. In a typical arrangement, the system that maintains data secured by the key (the "key client") authenticates itself to the key server and the key server authenticates itself to the key client. Following the mutual authentication, a client-server session is established wherein the client requests keys from a key server. In such an arrangement, the security of the system as a whole depends on the security of this initial authentication between client and server.

SUMMARY OF THE INVENTION

In one embodiment of a key management system according to aspects of the present invention, secured data is stored on a first system secured by a control key stored securely on a key server. The secured data is secured against attacks such as unauthorized use, modification or access, where authorization to access the secured data is determined by knowledge of an access private key of an access key pair. An example of securing the secured data is encrypting the data using the control key. When an authorized user is to access the secured data, the first system generates a request to the key server, signed with the access private key, wherein the request is for a decryption control key and the request includes a one-time public key of a key pair generated by the first system for the request. The decryption control key is the same as an encryption control key in the case of symmetric keys. The key server verifies the signature using the access public key of the access key pair. If the signature is valid, the key server sends the decryption control key to the first system, encrypted using the one-time public key. The first system can then decrypt the decryption control key from the response, using a one-time private key. The first system can then decrypt the secured data with the decryption control key remaining secured in transport.

Other features and advantages of the invention will be apparent in view of the following detailed description and preferred embodiments.

DETAILED DESCRIPTION OF THE INVENTION

The systems shown in the figures will first be described with reference to a specific use, that of securing application keys in a "key bag" on a first computer system, such that the application keys in the key bag cannot be accessed without making a request to a remote key server. As used herein, "remote" refers to being separated by a security boundary such that access to a local system does not automatically confer access to the remote system. It should be understood that remote does not require physical separation, but physical separation is one way to provide for remoteness. Given that definition, it should be apparent that a system can be configured such that a local system might be accessible to an attacker while the remote system is not.

Figure 1:
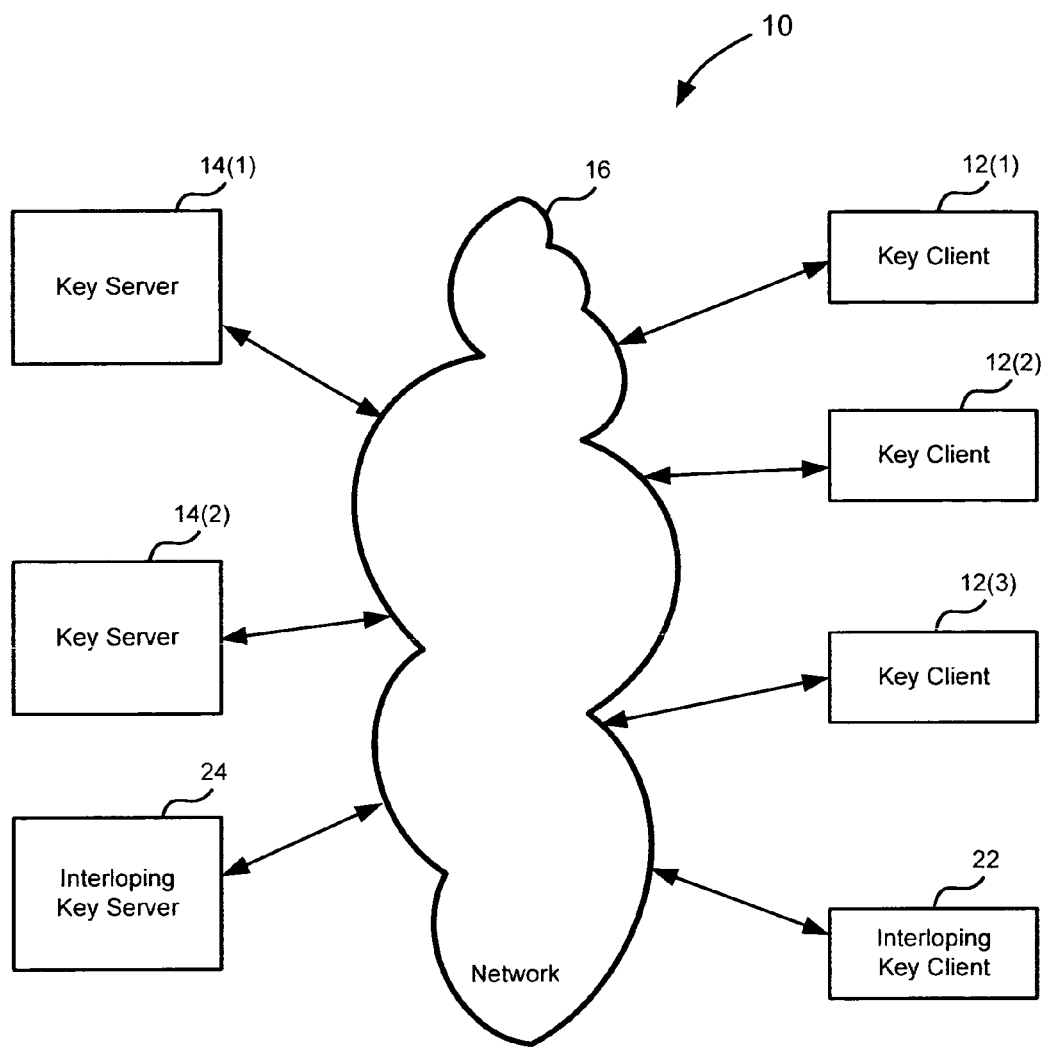
FIG. 1 is a block diagram of a network system in which various authorized key servers and authorized key clients are coupled to a network, and unauthorized servers and clients might also be coupled to the network.

FIG. 1 is a block diagram of an example arrangement 10 wherein the present invention might be used. As shown there, several key clients 12 and key servers 14 are coupled via a network 16. In specific implementations, key servers 14 might be Arcot's WebFort Key Authority servers and key clients 12 might be end-user browsing systems with an ability to perform secure operations on behalf of users.

One goal of arrangement 10 is to allow a key client to obtain a key from a key server relatively easily, while making security breaches difficult. One possible security breach can occur if an interloping key client 22 is able to retrieve from a key server a key that belongs to another key client. Another possible security breach can occur if an interloping key server 24 stands in place of an authorized key server. If interloping key client 22 were able to obtain a key for another key client, that interloping key client 22 could then impersonate another key client, such as by decrypting a stolen set of encrypted signing keys and then using those signing keys to sign messages. If interloping key server 24 were able to impersonate another key server, that interloping key server could provide a key client with defective keys and exploit weaknesses created by that action, or might work in concert with another attack to weaken key client security without the controls and constraints that an authorized key server would place on operations.

Figure 2:
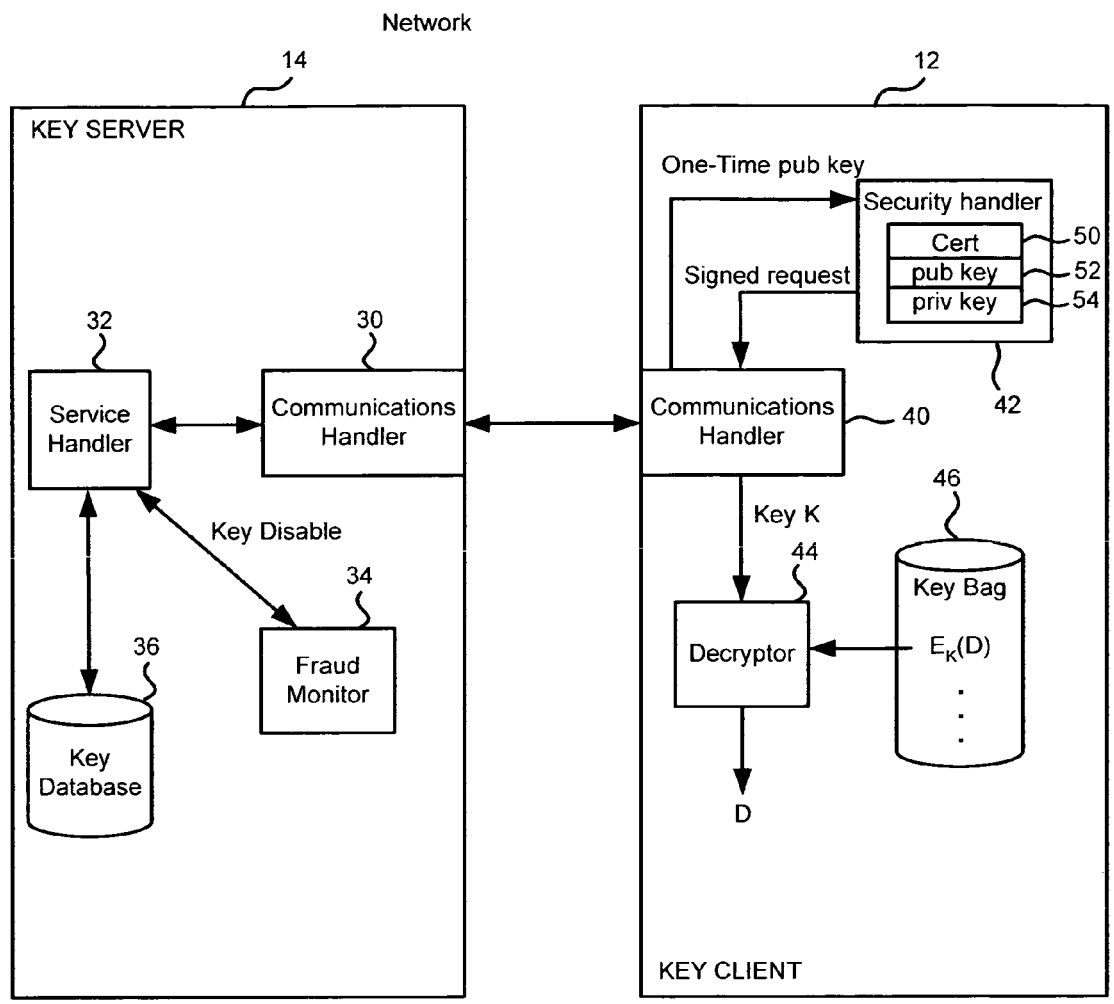
FIG. 2 is a block diagram of one key server and one key client.

FIG. 2 is a block diagram showing one key server 14 and one key client 12 in greater detail. As shown there, key server 14 comprises a communications handler 30, a service handler 32, a fraud monitor 34 and a key database 36. It should be understood that other configurations of key servers might be used instead. In the embodiment shown, communications handler 30 is coupled to key client 12 and handles communication. Communications handler 30 might be an HTTP server, an FTP server, a lower level TCP/IP packet handler, or other objects as would be known in the art. While a direct connection between key server 14 and key client 12 is shown, it should be understood that a possibly unsecured network might be interposed between the two, such that interloping by unauthorized servers and clients might be possible and therefore there is a lack of trust at the outset of a client-server connection.

As shown communications handler 30 is coupled to service handler 32, which is in turn coupled to fraud monitor 34 and key database 36. Also shown is a connection between fraud monitor 34 and service handler 32 for the purpose of disabling keys. While specific connections are shown, it should be understood that more connections or fewer connections could be used without departing from the scope of the invention.

In a typical operation, communications handler 30 receives a key request from a key client and passes that request to service handler 32. Service handler 32 then in turn determines whether to respond to the key request by obtaining a key for that key client from key database 36 and providing that key in response to the request. Alternatively, service provider 32 may decide not to respond to the request and so inform fraud monitor 34. Such an action might be taken if some predetermined threshold in the number of requests from a particular key client are made such that it would indicate a brute force attack. Additional details of the specific operation of service handler 32 and key database 36 are shown in subsequent figures and/or described below.

As for key client 12, it is shown comprising a communications handler 40, a security handler 42, a decryptor 44 and a key bag 46. Communications handler 40 handles communication from a key client 12 to a key server. Security handler 42 is shown further comprising various data elements, but it should be understood that additional data elements not shown might also be included. Security handler 42 maintains a certificate 50, an access public key 52 and an access private key 54. The access public key 52 may be encrypted and stored inside the certificate 50. Certificate 50 might be a certificate obtained from a certificate authority and associated with the access key pair such that an entity that trusts the certificate authority can be assured that if the certificate is valid, the access key pair is certified.

Various connections are shown in FIG. 2 for key client 12 for data and control passing among the various modules. It should be understood that more connections or fewer connections might be present. In one pair of connections shown, between communications handler 40 and security handler 42, communications handler 40 generates a one-time key pair and sends the one-time public key to security handler 42. Another data communications path is shown between security handler 42 and communications handler 40 for conveying a signed request from security handler 42 to communications handler 40. As explained in more detail below, the signed request is provided to a key server that results in communications handler 40 being provided with a key K. A communications path between communication handler 40 and decryptor 44 exists to provide key K to decryptor 44. Decryptor 44 is shown coupled to key bag 46 such that decryptor 44 can obtain an encrypted datum, encrypted using key K, and decrypt the datum D to make datum D available for use by key client 12.

Datum D can be any of various types of data elements. In one example, datum D is a signing key used by a browser or a PKI application. It is contemplated that key bag 46 might serve as a repository for a large and possibly varied collection of encrypted data elements. Elsewhere herein, datum D is a generalized to be an "access-controlled datum".

In a particular embodiment, the access-controlled datum is a conventional private key that can be used in "key system"—unaware systems, such as a conventional browser (e.g., Netscape Communicator browser, Microsoft Internet Explorer browser) or custom Public Key Infrastructure (PKI) applications. The access-controlled datum can be encrypted using the control key and a standard symmetric encryption algorithm such as Triple DES (3DES) or AES.

If the control key correctly decrypts the datum, the key client is then assured that it is talking to the legitimate key server, because only the legitimate key server could have transmitted the correct control key. There are well known techniques to recognize that the correct data was decrypted. For example, recognizable plain text could be included as part of the access-controlled datum to ensure the correct decrypted data can be recognized, or a keyed message authentication code (MAC) can be included with the datum.

Figure 3:
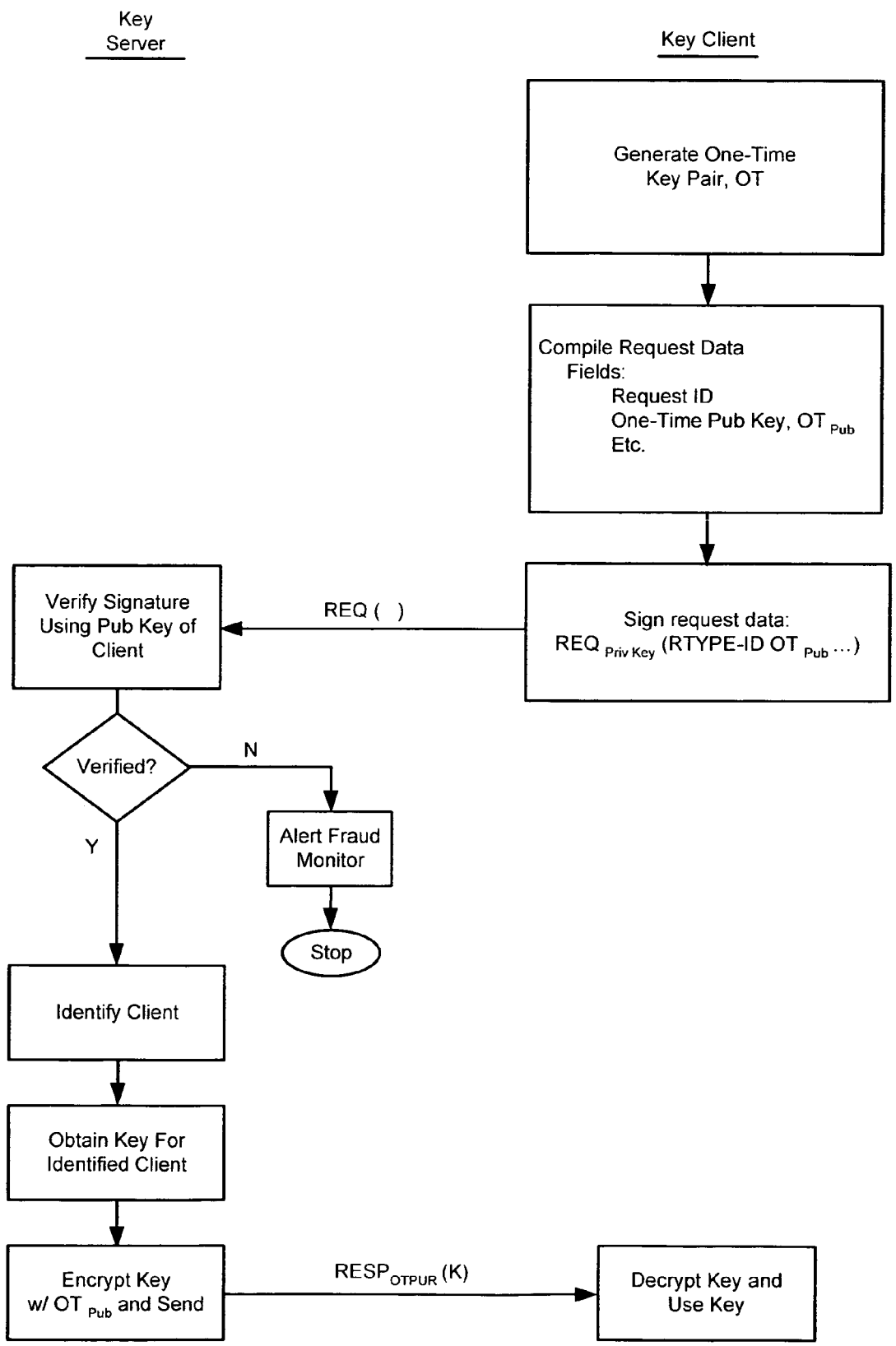
FIG. 3 is a swim diagram of a process for decrypting a key on a key client using a key stored on a key server.

FIG. 3 is a swim diagram illustrating a process whereby a key client obtains a control key from a key server. Notably, all the required authorization can be performed in one round trip messaging step and the control key can be obtained by the key client in that one round trip messaging step. Referring now to the figure, a process of accessing an access-controlled datum on the key client can begin with the key client generating a one-time key pair, OT. The key client then compiles a request message comprising data fields such as a request Type ID, and the public key portion ($OT_{pub}$) of the one-time key pair OT. The key client then signs the request data fields using the key client's access private key.

The access private key might be protected using cryptographic camouflage. Examples of cryptographic camouflage are described in more detail in U.S. Pat. No. 6,170,058 issued to Kausik (the disclosure of which is incorporated herein by reference for all purposes; hereinafter "Kausik"). The access private key might instead be stored in a hardware device such as a smart card. Since the Kausik camouflaging process might require detailed knowledge of the format and semantics of the datum, protecting the access-controlled datum using the system described herein is simpler than using cryptographic camouflage directly to protect it, as the access-controlled datum can be encrypted using standard symmetric encryption algorithms, obviating the need for knowledge of the format or semantics of the datum.

Referring again to FIG. 3, once the request is signed using the access private key, the request is sent to the key server. A key client might maintain a data structure that holds a reference to the key server to be used, a preferred key server and other key servers, or some other arrangement to determine the address of the key server to which the request will be directed.

Once a request is received by the key server, the key server verifies the key client's signature using the key client's public key. If the signature does not verify, the key server begins fraud processing, as might be done by a service handler sending a message to a fraud monitor.

However, if the signature does verify, the key server then identifies the key client, by the sender of the request, from a field in the request or by some other method. The key server then obtains a control key for the identified key client from the key server's key database. The key server then encrypts the key client's control key using the one-time public key provided with the request and then sends the encrypted control key to the key client. Since the key client generated the one-time key pair, the key client is able to decrypt the response from the key server using the one-time private key. The key client can then use the control key to decrypt and access-controlled datum that is encrypted using the control key or is decryptable using the control key. Preferably the control key is retained on the key client only as long as it is needed for private key operations in a given session.

The key server can use one or more of a variety of authentication techniques to authenticate the key client prior to responding to the request for control key. In one embodiment, the key server verifies the signature using a digital certificate provided by the key client along with the request.

In some cases, the key database is maintained in encrypted form. If that is the case, the key server maintains a master key usable to decrypt and identify the key client's control key prior to encrypting the control key with the one-time public key for the response to the key client.

Figure 4:
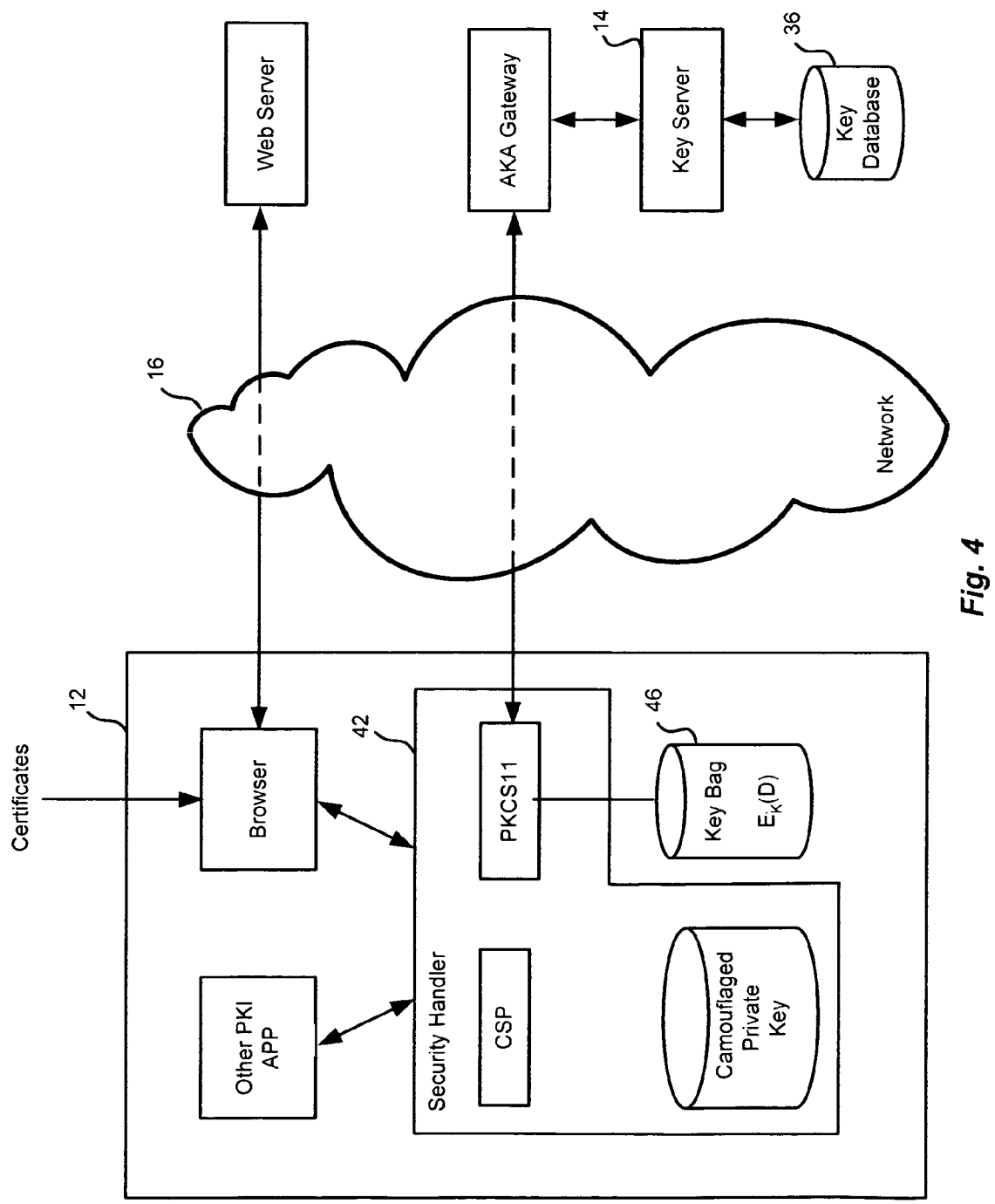
FIG. 4 is a block diagram showing one embodiment of the key client in more detail.

Referring now to FIG. 4, a network system is there shown, illustrating a system in which the access-controlled datum might be used. As shown there, key client 12 is a system that operates a browser, a security handler, and possibly other PKI applications. As is well known in the art of browser interfacing, the browser might obtain certificates from various sources and securely or unsecurely connect to a web server. In instances where the browser requires a private key, that private key might be represented by access-controlled datum D. In order for security handler 42 to provide the browser with datum D in an unencrypted form, security handler 42 interacts with key server 14, as described previously, possibly through a gateway such as an Arcot key authority (AKA) gateway, to obtain a control key from key database 36 that would allow for the decryption of the access-controlled datum.

Figure 5:
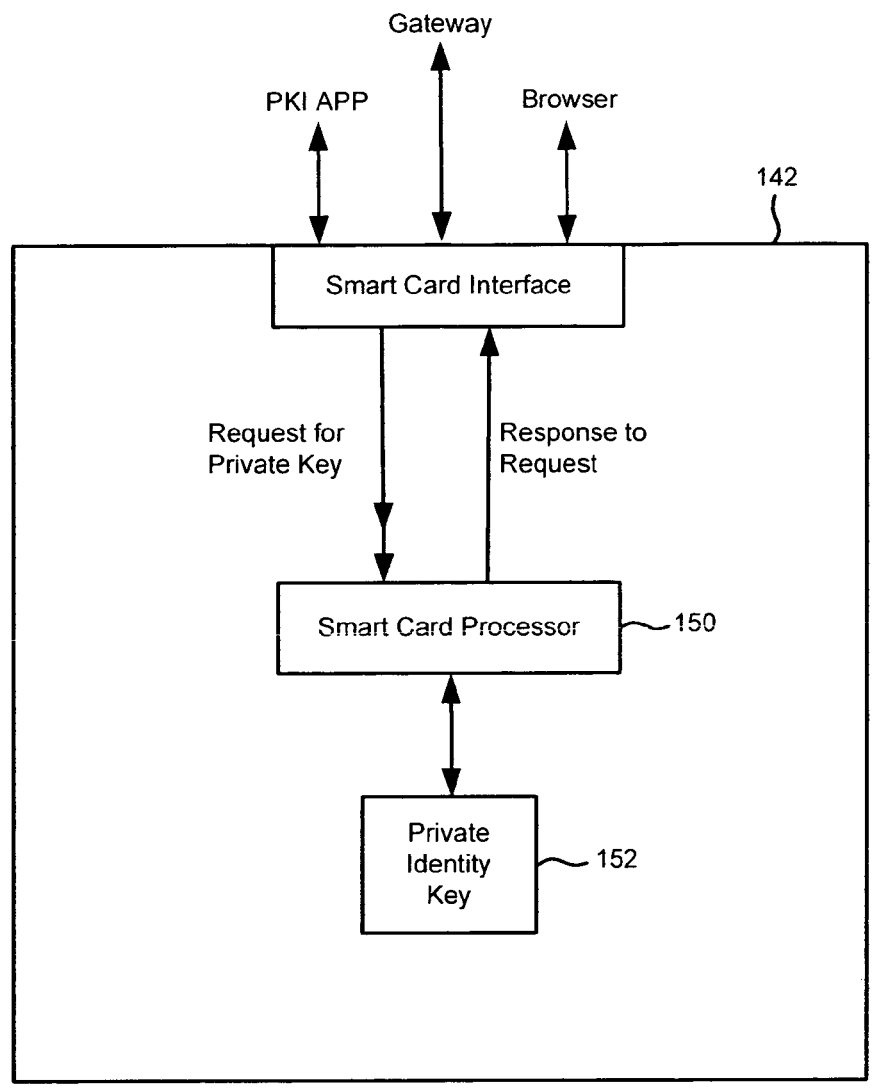
FIG. 5 is a block diagram showing another embodiment of a key client in more detail wherein the key client uses a smart card to secure authentication data used by the key client.

Key clients 12 as shown in FIGS. 2 and 4 use a security handler to provide the digital identity for key client 12. In an alternative embodiment, a hardware smart card 142 as shown in FIG. 5 is used in lieu of security handler 42. In such an embodiment, PKI applications and browsers will interact with a smart card interface 144 when requesting an access-controlled datum. Smart card interface 144 might also be used for interactions with a gateway or a key server. In a typical operation, a smart card processor 150 secured within a hardware smart card 142 receives a request for a private key operation (e.g. decryption, signing) and responds to requests by performing the requested operation with the private key stored in internal storage 152 and returning the result. As is well known in the art of smart cards, smart card processor 150 can be programmed to control access to the private identity key stored in storage 152.

However the access key is secured so that it provides a digital identity, knowledge of that access key allows a system to decrypt an access-controlled datum. If the access key is compromised, or needs to be regularly updated, or upon initialization of a key client, a new access key and process is needed for securely loading that new access key into a security handler or a smart card. When a security handler or a smart card is activated, the user whose identity will be represented registers the new access private key with the key server in an activation process.

The activation process begins with the user obtaining (by download or otherwise) a new data set for the security handler or a smart card and then activating the private key of the new data set. The activation process begins with the key client generating a one-time key pair and the key client composing an activation request message ("Create-Secret") requesting a new control key. The activation request message includes the one-time public key and is signed by the user's access private key. Although not required, the access private key can be the same for all identity records (IRs) maintained by the user, where each identity record is associated with a different set of key servers.

The key client sends the activation request message to a key server. The key server queries an authentication server to verify the signature on the request or otherwise checks a digital certificate. The authentication server returns the result of the verification to the key server. If signature verification is successful, the key server then parses the signed contents of the request message and detects that generation of a control key is being requested. The key server generates a control key, stores it securely in the key database under the requesting user's ID. If the user already has a control key or other secret, the key server will generate a second secret. Also, when the key server stores the control key securely in the key database, the key server encrypts the control key with the master key.

The key server then composes a reply message to the key client comprising at least a message type and the control key (or other secret). The reply message is encrypted with the one-time public key and sent to the key client. The key client then decodes and decrypts the reply message, encrypts the access-controlled datum (such as a conventional private key) with the new control key, and stores the address of the key server that generated the control key (if needed) in the IR. The control key can be cached in memory for subsequent operations in one session but is preferably not stored beyond the session.

The master key is used by the key server to encrypt and decrypt secret user-specific control keys that are stored in the key database. The key server obtains the master key when the key server starts or initializes. The master key can be stored in a hardware device, in a smart card or in a password-protected file. An administrator can optionally be required to enter a password at the time of starting or initializing the key server. The password is used to decrypt the master key to make it available for use by the key server. If the master key is stored in a password-protected file, many standard techniques are available to store the key in a password-protected file. One of these techniques is the PKCS#12 standard.

While the system above is described with the authentication server and the key server being separate elements, some embodiments might have the authentication server and key server built as one server. In those embodiments, messages would not need to be sent from the key server to the authentication server to verify signatures. Some embodiments might secure other types of access-controlled data beyond just conventional private keys.

The client software might be a browser, a PKI application, a VPN (virtual private network) client software program that needs to have secure storage of a private key that is used for Internet Protocol (IP) security. The PKI application might be a network log-on program for a particular operating system such as UNIX, Linux, or Windows that requires the secure storage of a private key. The PKI application might instead be a software program that requires the secure storage of a private key, such as a program implementing a version of the Kerberos security protocol, an email program, a program that uses client-authenticated SSL (Secure Sockets Layer) or TLS (Transport Layer Security), a wireless or mobile device program, or a database client program. In a specific implementation of a client system, the access-controlled datum is a signing key usable for a browser or a custom Public Key Infrastructure (PKI) application.

A specific embodiment using key fragments will now be described. In this embodiment, the user's key bag is encrypted with a large random symmetric key and can be stored temporarily or permanently on the user's computing system (usually the machine that executes the key client). One fragment of the symmetric key is stored on a secure server, referred to herein as a Key Authority (KA), which might have the same or similar role as the key server described above. In order to decrypt and use a key from the key bag, the user must prove access to identifiers that allow the user's system to authenticate the user to the KA, such as by entering a Personal Identification Number (PIN) or by use of a smart card in possession of an authorized user. If those conditions are met, the KA provides a key fragment that can be combined with a second fragment stored as part of the user credentials on the key client machine. This combination results in a key usable to decrypt a key from the key bag.

With the user client-KA interactions, strong two-factor authentication can be used to authenticate the client to the KA and it can be implemented entirely in software, such as by use of cryptographic camouflage described in U.S. Pat. No. 6,170,058. One use for such a system is as a replacement for hardware smart cards in PKI applications such as S/MIME, Form Signing, and SSL Client Authentication or any application that uses PKCS#11 modules and/or CSPs.

Figure 6:
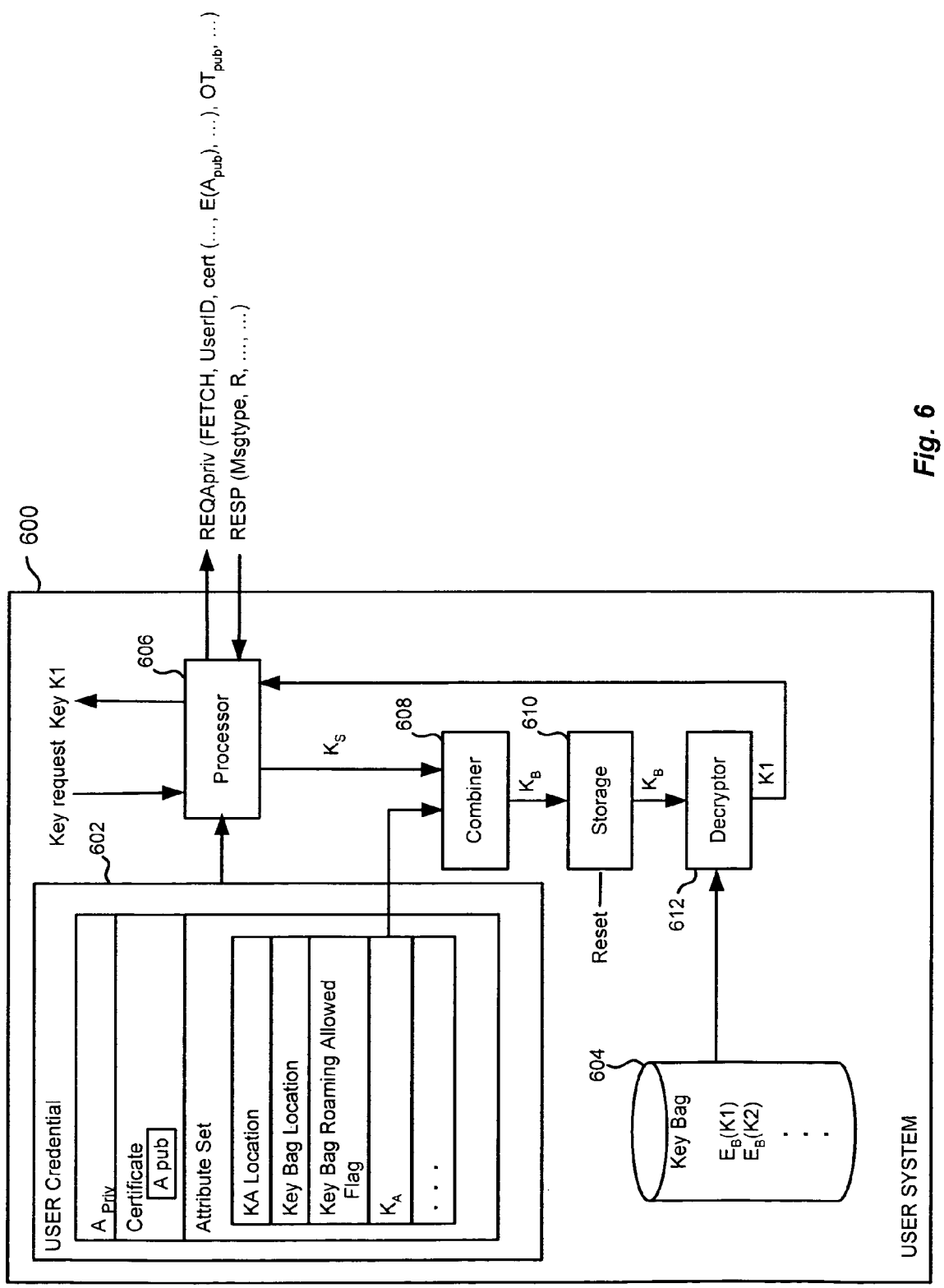
FIG. 6 is a block diagram of a user system.

FIG. 6 is a block diagram of a user system 600 that might be used to implement such a user system. As shown there, user system 600 includes a user credential 602 (i.e., a dataset representing the user's identity for key purposes), a key bag 604, a processor 606, a combiner 608, key storage 610 and a decryptor 612. User credential 602 is shown comprising an access private key (Apriv), a certificate including an encrypted public key (Apub) corresponding to Apriv, and an attribute set. The attribute set forms part of the user's identity for authentication and keying purposes and includes various data fields, including a KA location field indicating where the KA for this user is located, a key bag location field indicating where the key bag is located, a flag to indicate whether or not a remote key bag is allowed, and a local key fragment, Ka. Usually, the key bag is local to the user system, but it can be remotely stored to allow roaming and for other reasons. In some cases, the user system would have multiple user credential 602, as for the case where a user might have been otherwise issued multiple smart cards.

Figure 7:
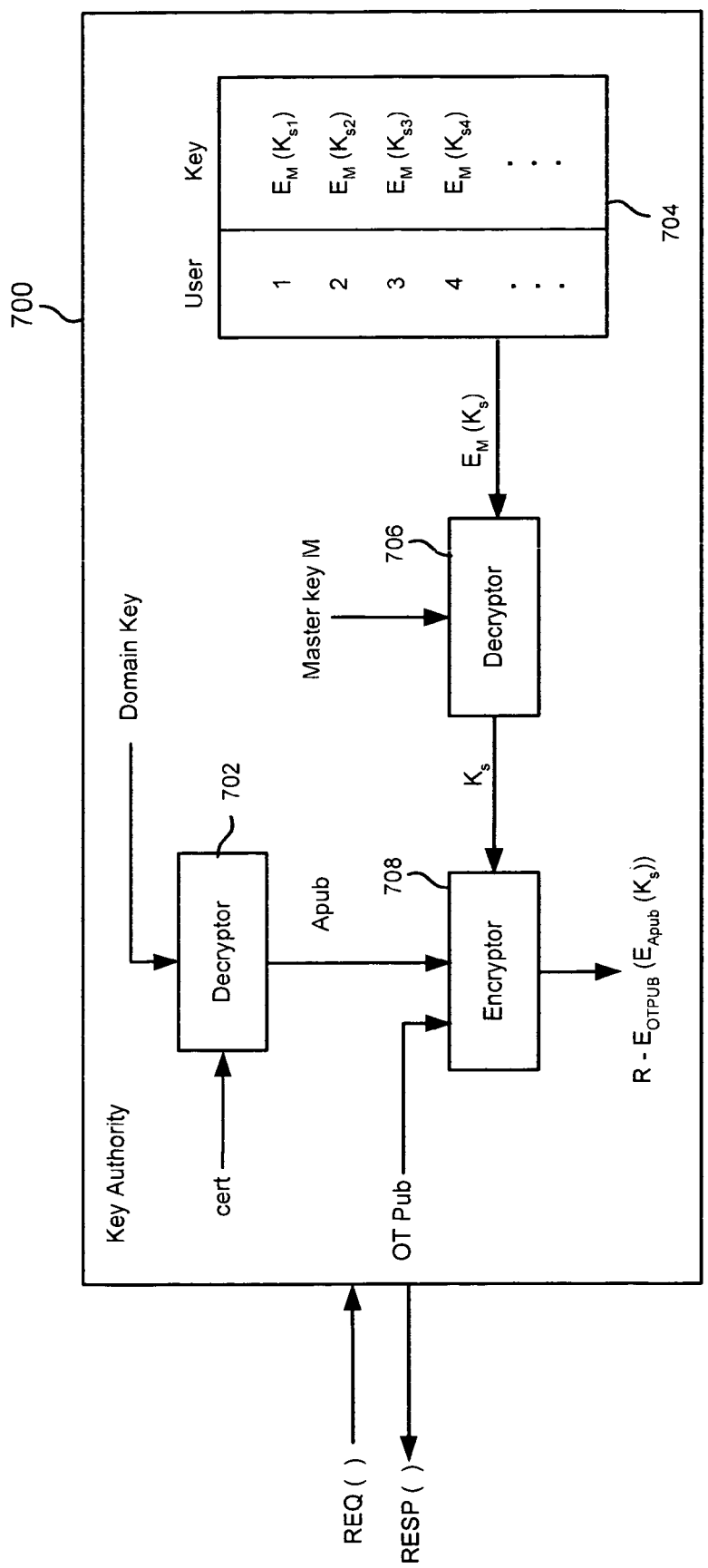
FIG. 7 is a block diagram of a key authority server.

FIG. 7 is a block diagram of a KA system that might interact with one or more user systems 600. As shown there, a KA 700 comprises a certificate decryptor 702, a key database 704, a decryptor 706 and an encryptor 708. It should be understood that Ka includes other elements as needed to perform the actions described herein.

The access private key represents the secure digital identity of the user and can be protected using cryptographic camouflage. The keys stored in the key bag can be conventional private keys that can be generated and used by many PKI applications that might not be aware of cryptographic camouflage. To decrypt a key from the key bag, the user system sends a request to the KA and the KA returns a key fragment. This process will now be described in further detail, with reference to FIGS. 6-7.

The key decryption process begins when an application on user system 600 requires a key. That application makes a key request to processor 606, which then works to generate a key in response to that request. Processor 606 formulates a request to the KA in the form generally shown in FIG. 6.

Certificate authority products often generate a conventional key by sending a web page to a browser on the user's system with key generation instructions, which are then executed by the user's system. In executing the instructions, the browser invokes processor 606 or makes a request to an already-invoked processor 606, which then might act as a PKCS#11 module or CSP to generate a key pair and a PKCS#10 certificate request.

Processor 600 determines which KA to use by examining KA location attribute of the user credential. The request to the KA includes an indication of the type of request (e.g., "FETCH"), a UserID, the certificate that includes the public key Apub in encrypted form, a one-time public key, and possibly other fields. The request is signed using the access private key Apriv. The one-time public key is a key of a one-time public key pair generated by processor 606 for this particular request. The certificate might be signed as part of the request, but need not be signed.

When KA 700 receives a request, it verifies the signature using a KA domain key. Preferably, only the KA has the domain key used by decryptor 702 to decrypt the access public key Apub from the certificate. The domain key can be stored in a hardware device or a password-protected file.

If verification is successful, KA 700 obtains a secret key fragment from key database 704. The particular key fragment is the key fragment associated with the user making the request. In some embodiments, there is only one key fragment per unique user, but in other embodiments, key database 704 might maintain more than one key fragment for a given user and the request would specify which key fragment is being requested.

In formulating a response datum, R, to include in the response to user system 600, KA 700 decrypts the key fragment Ks with a master key M, as the key fragments are all encrypted in key database 704 for additional security. The key fragment is then encrypted using the one-time public key, OTpub, thus forming the response datum R.

The KA master key M is used to encrypt and decrypt user-specific data that is stored in the key database. The KA obtains the master key when it starts or initializes. The master key can be stored in a hardware device, in a smart card or in a password-protected file. An administrator can optionally be required to enter a password at the time of starting or initializing the KA. This password can be used to decrypt the master key to make it available for use by the KA.

Once processor 606 receives the response, it decrypts R using the one-time private key and then decrypts the result using the access private key to reveal the secret key Ks. Processor 606 then provides Ks to combiner 608 that combines, by concatenation or otherwise, Ks and Ka to form Kb. One possible combination technique is the use of a hash algorithm such as SHA-1 or MD5. A hash is preferred over simple concatenation because the result of the hash combination is of a specific length. Kb is usable to decrypt one or more conventional private keys from key bag 604. The private keys can then be used for purposes such as signing. Kb is optionally cached in memory (e.g., storage 610) for subsequent operations in the same session but can be reset or erased after the session is complete.

The above description assumes that a user system had already established a relationship with a KA, which would store a secret key fragment Ks for that user. In an initialization phase, the user system might send a request with a different request type, such as a "CREATE" request instead of a "FETCH" request. When a KA receives a CREATE request and the signature of the request verifies, the KA generates a secret key Ks and stores it securely in its key database under the requesting user's UserID, encrypted using the master key. The KA then sends a response containing the secret key Ks. The response is encrypted using the one-time key provided in the request.

Once processor 606 receives the response, it decrypts R using the one-time private key and then decrypts the result using the access private key to reveal the secret key Ks. Processor 606 can then user Ks to encrypt conventional private keys for storage in the key bag, using a symmetric key, Kb, created by combining Ks and Ka.

In the system described above, the conventional private keys are stored in a key bag located on the user system and the user credentials are stored on the user system. In other embodiments, the user credentials and/or key bag is stored on a server, which allows the user to use the conventional private keys while away from the local user system. The KAs that host the roaming user credentials or encrypted key bags can be separate instances of KAs from those that provide the secret keys, or they can be the same systems. If roaming support is to be disabled, the "KeyBagRoamingAllowed" flag of the user attributes can be set to "No".

In the first type of roaming, the user does not need the user credential on the user's local machine. The user might access a server (such as a Web server using a Web browser) that operates a roaming service. The user is prompted with a set of predefined questions such as "Name of Pet?" or "Name of Childhood Teacher?" that form a challenge. If the questions are answered correctly, the user credential of that user is downloaded to the user's current local machine. Preferably, when the user credentials are stored in a database at the roaming server, at least the access private keys are protected with cryptographic camouflage and the Ka key fragment can be stored in encrypted form (using software or hardware module encryption) to prevent knowledge of individual user Ka values at the server.

With the second type of roaming, the user stores conventional private keys so that they can be accessed while roaming. It should be understood that, in both cases, the location of the user credential and key bag may be the same for roaming and nonroaming use, but in the former case, the user system would act as a server for the user's current local system. However it is arranged, when the user is roaming and does not maintain a local copy of his or her key bag, processor 600 would contact the server that hosts the encrypted key bag using the user's user credential by sending the server a signed "FETCH" message. The process and message flow for downloading the encrypted Key Bag is identical or similar to the process used to download secret key Ks, except that the encrypted key bag is the data sent, rather than Ks.

In previously described embodiments, the user system performed its operations while connected to a KA via a network. In some cases, a user may need to perform private key operations while not connected to the network. For example, the user may wish to sign or decrypt S/MIME e-mail on his or her laptop while sitting on an airplane. To allow such operations, some embodiments include an offline mode as well as the online mode described above.

To enable offline operation, when the user credential is registered, the user selects an offline password. When a user elects to "go offline", processor 600 authenticates the user to the KA using the user credential and a user-entered PIN. The processor then automatically downloads an "offline key container". To unlock the offline key container for each disconnected session, the user would have to provide the processor with the offline password. The offline key container can be automatically erased after some predefined criteria is met, such as the passage of a set amount of time, or when the user is next online. The KA might be configured to include administrative policy settings, such as a time limit for usage of the offline key container, time ranges and day ranges that a user is allowed to interact with KA, and/or IP address ranges that a user is allowed for interaction with KA.

The application might involve a computational agent that represents the user, where the computational agent runs on software and/or hardware and stands in the place of the user. Some embodiments might include other types of requests beyond a request for a control key and a request to generate a new control key. If smart cards are used, they might be SIMM cards or GSM cellular telephone compatible smart cards.

Novel techniques for managing access-controlled data have now been presented. The invention has now been described with reference to the preferred embodiments. Alternatives and substitutions will now be apparent to persons of skill in the art. Accordingly, it is not intended to limit the invention except as provided by the appended claims.

What is claimed is:

1. A method of accessing encrypted data, wherein the encrypted data is stored on a first secured system and a key usable for decrypting the encrypted data is stored on a second secured system and wherein the first secured system maintains a first private key of a first secured system key pair, the method comprising:

obtaining a onetime key pair at the first secured system;

generating a request by the first secured system for the key, wherein the request includes at least a onetime public key of the onetime key pair, wherein the onetime public, key is unknown to the second secured system prior to sending the request to the second secured system;

signing the request with the first private key of the first secured system;

sending the request signed by the first private key to the second secured system, wherein the second secured system is a key server;

at the key server, obtaining the key from among a plurality of stored keys;

responding to the request signed by the first private key with a response from the second secured system, wherein the response includes at least the key requested by the first secured system, encrypted using the onetime public key provided in the request signed by the first private key;

decrypting at least a part of the response using the one-time private key, so as to obtain the key;

using at least the key provided as part of the response to decrypt the encrypted data; and deleting, at the first secured system, the key obtained from the key server, once access to the encrypted data is complete for a given session, such that the key is not maintained at the first secured system.

2. The method of claim 1, wherein obtaining the one-time key pair at the first secured system comprises generating the one-time key pair at the first secured system.

3. The method of claim 1, wherein the encrypted data comprises a plurality of private keys.

4. A secured key server and a plurality of key clients, wherein keys for the plurality of key clients are maintained at the secured key server, the secured key server comprising:
   a database of keys stored on the secured key server, wherein each key is associated with a key client;
   a communications module for receiving key requests, a key request including a one-time public key signed by a first private key of a key client, wherein the one-time public key is unknown to the communication module prior to receiving the key request;
   logic for authenticating the key client based on a public key of the key client;
   logic for obtaining the key from among a plurality of stored keys;
   logic for encrypting a response that includes the requested key and that is encrypted using the one-time public key;
   logic for sending the response to the key client; and
   each of the plurality of key clients comprising:
   logic for deleting the requested key once access to encrypted data is complete at the key client for a given session, such that the requested key is not maintained at the key client.

5. A method of decrypting encrypted data, the method comprising:
   generating a one-time key pair that comprises a one-time public key and a first private key;
   generating a request by a key client for a decryption key stored on a key server, wherein the request includes the onetime public key;
   signing the request with a second private key;
   determining by the key client which of a plurality of key servers to use to obtain the decryption key by querying a database of key servers;
   transmitting the request to the key server;
   in response to receiving a response encrypted by the one-time public key associated with the request from the key server, decrypting the response using the first private key to obtain the decryption key;
   using at least the decryption key provided as part of the response to decrypt the encrypted data; and
   deleting the decryption key obtained from the key server following access to the encrypted data, such that the key is not maintained at the key client.

6. The method of claim 5, wherein signing the request comprises camouflaging the second private key with cryptographic camouflage.

7. The method of claim 5, wherein generating the request comprises storing the second private key on a hardware device independent of the key client.

8. The method of claim 5, wherein signing the request comprises encrypting the one-time public key with the second private key, and storing the encrypted one-time public key in a digital certificate.

* * * * *